March 8, 1938.  A. MAUSER  2,110,651
TRAP
Filed May 11, 1937
Fig. 1.
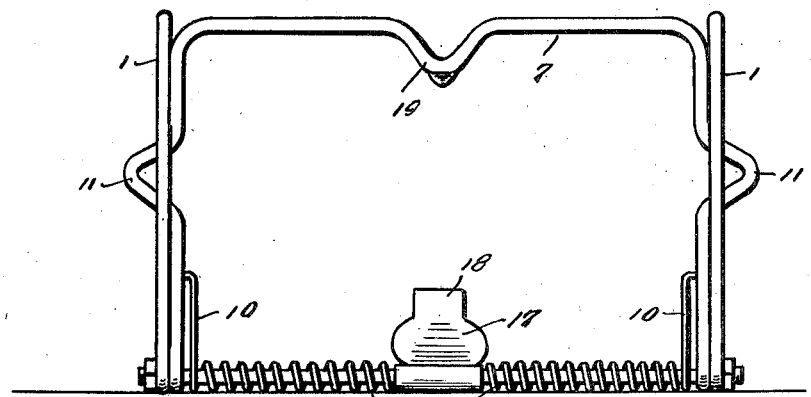
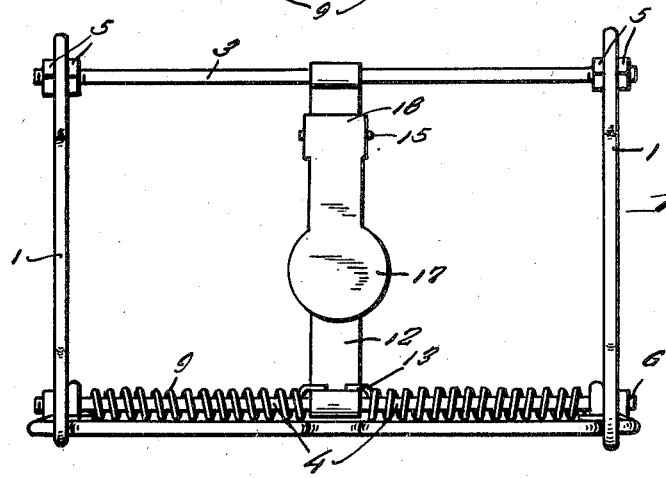
Fig. 2.
Fig. 3.
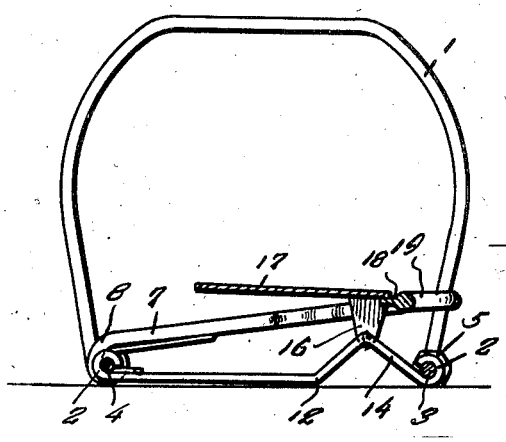
Inventor
Andrew Mauser
By Clarence A. O'Brien
Hyman Berman
Attorneys Patented Mar. 8, 1938

2,110,651

UNITED STATES PATENT OFFICE 2,110,651

TRAP

Andrew Mauser, Jewett City, Conn.

Application May 11, 1937, Serial No. 142,022

1 Claim. (Cl. 43—85)

This invention relates to a trap mainly designed for catching animals passing through or from a passageway, the general object of the invention being to provide an efficient trap which can sell at low cost and the parts of which can be readily separated for shipment and packing.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is an elevation of the improved trap.

Figure 2 is a top plan view thereof.

Figure 3 is a central vertical sectional view through the trap with the same in set position.

As shown in this drawing the trap includes a pair of inverted U-shaped end members 1 having their ends bent to form eyes 2. Rods 3 and 4 have their ends passing through the eyes and the rod 3 has inner and outer nuts 5 on each end thereof between which an eye is located so that one end of the end members is firmly attached to the rod. A nut 6 is threaded on each end of the rod 4 and the other eyes of the end members have their outer faces bearing against these nuts. A bail has eyes 8 at its ends and the rod 4 passes through said eyes and the eyes of the bail are arranged adjacent or bear against the inner faces of the eyes of the end members through which the rod 4 passes. A pair of coil springs 9 encircle the rod 4 and have their outer ends substantially extending to the inner faces of the eyes of the bail and said outer ends of the springs are formed with the extensions 10 which are hooked into engagement with the legs of the bail and act to hold the bail in upright position with the outwardly extending offset portions 11 formed on the legs of the bail contacting parts of the end members. A cross plate 12 has its ends bent around the central parts of the rods 3 and 4 and the inner ends of the springs abut that part of the cross plate which is connected with the rod 4 and said inner ends of the springs are formed with extensions 13 which engage the cross plate to prevent rotary movement of the springs.

Adjacent the rod 3 the cross plate is bent upwardly into inverted V-shape to form the projection 14, the top part of which is formed with trunnions 15 which pass through openings in the depending ears 16 on the reduced part of the bait pan 17. A trigger part 18 is formed on the small end of the pan for engaging an inwardly extending part 19 on the bight of the bail for holding the bail in lowered position as shown in Figure 3.

As will be seen to set the trap it is simply necessary to swing the bail downwardly against tension of the springs until the bent part 19 of the bail is in position to be engaged by the part 18 of the pan when the pan is lifted, as shown in Figure 3. The trap is then placed in a passageway with the end members 1 in alignment with the passageway or the trap can be placed at the outlet of the passageway with said end members in alignment so that an animal passing through or from the passageway will pass through one of the end members and thus strike the pan or attempt to secure bait from the pan. This will release the bail from the pan so that the springs will throw the bail upwardly and catch the animal between a leg of the bail and a leg of the adjacent end member.

As will be seen the trap can be manufactured to sell at low cost and the parts can be readily separated so that it can be readily carried from one place to another or shipped or packed.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A trap of the class described comprising a pair of end members of substantially inverted U-shape, and having eyes formed at their ends, a pair of rods having their ends passing through the eyes, nuts on the rods for holding the end members against movement on the rods, a bail having eyes at its ends through which one rod passes, a cross plate having its ends bent around the rods, springs encircling the rod which passes through the eyes of the bail and each having one end engaging the bail and its other end the cross plate, said springs normally holding the bail with parts against portions of the end members, an upwardly extending projection on the cross plate adjacent the other rod and having trunnions on its edges, a bait pan having depending ears having openings therein for receiving the trunnions, a trigger forming extension on the pivoted end of the pan and the bight of the bail having an inwardly extending projection for engaging the trigger forming part for holding the bail in set position.

ANDREW MAUSER.